US012750096B2

(12) United States Patent
Pabst

(10) Patent No.: US 12,750,096 B2
(45) Date of Patent: Sep. 29, 2026

(54) MEASURING CHARACTERISTICS OF A RECONFIGURABLE INTELLIGENT SURFACE

(71) Applicant: Rohde & Schwarz GmbH & Co. KG, Munich (DE)

(72) Inventor: Alexander Pabst, Taufkirchen (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 336 days.

(21) Appl. No.: 18/236,761

(22) Filed: Aug. 22, 2023

(65) Prior Publication Data

US 2024/0097741 A1 Mar. 21, 2024

(30) Foreign Application Priority Data

Sep. 20, 2022 (EP) .................................... 22196475

(51) Int. Cl.

*H04B 7/04* (2017.01)
*H04W 24/06* (2009.01)
*G01S 7/40* (2006.01)

(52) U.S. Cl.

CPC ........ *H04B 7/04013* (2023.05); *H04W 24/06* (2013.01); *G01S 7/40* (2013.01)

(58) Field of Classification Search

CPC ... H04B 7/04013; H04B 7/155; H04W 24/06; G01S 7/40

See application file for complete search history.

(56) References Cited

U.S. PATENT DOCUMENTS

2021/0384958 A1* 12/2021 Denis ..................... H04B 7/145
2022/0059943 A1 2/2022 Saab et al.
2022/0278738 A1* 9/2022 Dai .................... H04B 7/15507
2023/0093595 A1* 3/2023 Nam ................. H04W 56/0035 375/262
2023/0129288 A1* 4/2023 Sun .................... H04B 7/04026 375/267
2023/0246674 A1* 8/2023 Åström .................. H04B 7/145 375/262

(Continued)

FOREIGN PATENT DOCUMENTS

EP 3869616 A1 8/2021
EP 3962006 A1 3/2022
WO 2021/239311 A1 12/2021

OTHER PUBLICATIONS

Zhang et al., "Performance Analysis of RIS-Aided Systems With Practical Phase Shift and Amplitude Response", IEEE Transactions on Veiiicular Technology, vol. 70, No. 5, May 2021, pp. 4501-4511 (Year: 2021).*

(Continued)

*Primary Examiner* — Shah M Rahman

(74) *Attorney, Agent, or Firm* — DITTHAVONG, STEINER, & MLOTKOWSKI

(57) ABSTRACT

A method for measuring the performance of a reconfigurable intelligent surface is provided. Said method comprises the steps of transmitting (100) a transmit signal to the reconfigurable intelligent surface, receiving (101) the corresponding refection from the reconfigurable intelligent surface as a receive signal, and comparing (102) the transmit signal and the receive signal to determine or derive phase and/or amplitude changes imposed by the reconfigurable intelligent surface.

20 Claims, 4 Drawing Sheets

(56) References Cited

U.S. PATENT DOCUMENTS

| | | | | |
|---|---|---|---|---|
| 2024/0007148 | A1* | 1/2024 | Ellenbeck | H04B 7/06952 |
| 2024/0039584 | A1* | 2/2024 | Duan | H04B 7/0413 |
| 2024/0049026 | A1* | 2/2024 | Polehn | H04W 24/10 |
| 2024/0063865 | A1* | 2/2024 | Jung | H04B 7/04013 |
| 2024/0107485 | A1* | 3/2024 | Duan | H04B 7/155 |
| 2024/0171222 | A1* | 5/2024 | Capolino | H01Q 15/0066 |
| 2024/0396589 | A1* | 11/2024 | Sahraei | H04L 5/0042 |
| 2024/0413858 | A1* | 12/2024 | Mcmenamy | H04W 24/10 |
| 2024/0413868 | A1* | 12/2024 | Haghighat | H04L 25/0204 |
| 2025/0047328 | A1* | 2/2025 | Medra | H04B 7/04013 |
| 2025/0138129 | A1* | 5/2025 | Walker | G01S 13/003 |
| 2025/0158661 | A1* | 5/2025 | Zhu | H04L 25/4927 |
| 2025/0317164 | A1* | 10/2025 | Ali | H04B 7/0695 |
| 2025/0374024 | A1* | 12/2025 | Tapio | H04B 7/04013 |
| 2025/0385715 | A1* | 12/2025 | Huang | H04B 7/04013 |

OTHER PUBLICATIONS

Office Action for related European Patent Application No. 22196475. 2-1206, dated Feb. 13, 2023, 10 pages.

Sanchez et al., "Optimal, Low-Complexity Beamforming for Discrete Phase Reconfigurable Intelligent Surfaces", 2021 IEEE Global Communications Conference (GLOBECOM), 6 pages.

Gao et al., "Propagation Characteristics of RIS-assisted Wireless Channels in Corridors: Measurements and Analysis", 2022 IEEE/CIC International Conference on Communications in China (ICCC), 2022, pp. 550-554.

* cited by examiner

MEASURING CHARACTERISTICS OF A RECONFIGURABLE INTELLIGENT SURFACE

RELATED APPLICATION

This application claims priority to European Patent Application No. 22 196 475.2 filed on Sep. 20, 2022, the contents of which are incorporated in its entirety.

BACKGROUND

The invention relates to a method for measuring one or more characteristics ("performance") of a reconfigurable intelligent surface, a measurement device for measuring the performance of a reconfigurable intelligent surface, and a measurement system for measuring the performance of a reconfigurable intelligent surface.

Generally, reconfigurable intelligent surfaces (RIS) are gaining major importance. Such reconfigurable intelligent surfaces are known as such and are especially embodied in the context of wireless technology for the control of the radio signals between a transmitter and a receiver in a dynamic and goal-oriented way, preferably turning the wireless environment into a service. This has motivated a host of potential new use cases targeting at, for instance, the enhancement of various system key-performance-indicators (KPIs) and/or the support of new wireless technology applications and capabilities. These exemplarily include enhancements to the capacity, coverage, positioning, security, and sustainability, as well as the support of further sensing, wireless power transfer, and ambient backscattering capabilities.

However, there are no possibilities for measuring performance of reconfigurable intelligent surfaces or for testing correct functioning thereof, respectively, available.

For example, US 2022/0059943 A1 shows a multi-layer RIS. Said RIS includes a unit-cell of a reconfigurable intelligent surface. The unit-cell includes a first layer composed of a conductive material and structured according to a sub-wavelength reflective pattern. The first layer reflects an impinging wave at a predetermined phase and steers the reflected impinging wave toward an intended receiver. The unit-cell includes a second layer composed of a first dielectric substrate material. Between the first and second layers, the unit-cell includes a middle layer composed of a second dielectric material having tunable dielectric properties. Tuning a dielectric constant of the second dielectric material modifies the predetermined phase of reflection of the impinging wave.

Furthermore, EP 3 962 006 A1 relates to channel estimation, at a receiving device of a communication system employing a (re)configurable surface. The channel estimation includes beamforming search to obtain trained reflection coefficients of the configurable surface and an angle of arrival, AoA, of the signals at the receiving device. Then, based on the configurable surface and the obtained AoA at the receiving device, reflection coefficients of the configurable surface are derived for an ideal channel portion between the transmitting device and the configurable surface. According to a relation between the trained reflection coefficients and the estimated reflection coefficients, the estimation of the characteristics of a channel between the transmitting device and the configurable surface is performed. The channel estimation may be employed in user mobility tracking.

Moreover, WO 2021/239311 A1 discloses a reflective surface for directing wireless communications signals, the reflective surface comprising a plurality of independently reconfigurable elements disposed irregularly on the surface. Additionally, a method of controlling a communication channel of a wireless communication system is presented, the system comprising the reflective surface having an irregular element arrangement.

Accordingly, there is the object to provide a method for measuring the performance of a reconfigurable intelligent surface, a measurement device for measuring the performance of a reconfigurable intelligent surface, and a measurement system for measuring the performance of a reconfigurable intelligent surface, thereby ensuring a high accuracy and efficiency of the measurement.

SOME EXAMPLE EMBODIMENTS

This object is solved by the features of claim 1 for a method for measuring the performance of a reconfigurable intelligent surface, the features of claim 11 for a measurement device for measuring the performance of a reconfigurable intelligent surface, and the features of claim 13 for a measurement system for measuring the performance of a reconfigurable intelligent surface. The dependent claims contain further developments.

According to a first aspect of the invention, a method for measuring one or more characteristics ("performance", typically the modification of electromagnetic parameters of an incoming RF signal) of a reconfigurable intelligent surface is provided. Said method comprises the steps of transmitting a transmit signal to the reconfigurable intelligent surface, receiving the corresponding refection from the reconfigurable intelligent surface as a receive signal, and comparing the transmit signal and the receive signal to determine or derive phase and/or amplitude changes imposed by the reconfigurable intelligent surface. Thus phase and amplitude are examples of electromagnetic parameters modified by the RIS. Advantageously, not only performance but also correct functioning of reconfigurable intelligent surfaces can be tested in a highly accurate and efficient manner.

According to a first preferred implementation form of the first aspect of the invention, the reconfigurable intelligent surface comprises or is a passive reconfigurable intelligent surface. Advantageously, for instance, power consumption can be reduced, thereby increasing efficiency.

According to a second preferred implementation form of the first aspect of the invention, the reconfigurable intelligent surface comprises or has a planar or bent or spherical surface. Advantageously, for example, a high flexibility can be ensured, which leads to an increased efficiency.

According to a further preferred implementation form of the first aspect of the invention, the comparison of the transmit signal and the receive signal is effected by radar and/or interference techniques. It is noted that the method may especially comprise the step of effecting the comparison of the transmit signal and the receive signal by radar and/or interference techniques. Advantageously, for instance, complexity, and thus inefficiencies, can be reduced.

According to a further preferred implementation form of the first aspect of the invention, the transmit signal is generated with the aid of at least one phase locked signal source. It is noted that the method may especially comprise the step of generating the transmit signal with the aid of at least one phase locked signal source. Advantageously, for example, accuracy can further be increased.

According to a further preferred implementation form of the first aspect of the invention, the receive signal is received with the aid of at least one receiver working in close proximity to the reconfigurable intelligent surface. Advantageously, for instance, accuracy can further be increased.

According to a further preferred implementation form of the first aspect of the invention, the transmit signal is transmitted from close proximity to the reconfigurable intelligent surface and/or the receive signal is received in close proximity to the reconfigurable intelligent surface but especially outside of the corresponding reactive near field preferably to avoid respective direct coupling. Advantageously, for example, inaccuracies can further be reduced.

According to a further preferred implementation form of the first aspect of the invention, the method further comprises the step of varying the corresponding position from which the transmit signal is transmitted and/or at which the receive signal is received in a manual manner and/or with the aid of positioning means. Advantageously, for instance, the invention can flexibly be used in the context of both field testing, especially maintenance, and lab testing, especially production.

According to a further preferred implementation form of the first aspect of the invention, the method further comprises the step of communicating with at least one control unit and/or at least one processing unit of the reconfigurable intelligent surface especially to read and/or set at least one corresponding signal and/or command preferably with respect to respective controlling and/or processing. Advantageously, for example, said at least one corresponding signal and/or command preferably with respect to respective controlling and/or processing may be correlated with the transmit signal and/or the receive signal, thereby especially allowing for correct functioning testing in a particularly efficient manner.

According to a further preferred implementation form of the first aspect of the invention, the method further comprises the step of determining if the reconfigurable intelligent surface works in a desired manner on the basis of the communication with the at least one control unit and/or the at least one processing unit of the reconfigurable intelligent surface. Advantageously, for instance, feedback in addition to the receive signal from the reconfigurable intelligent surface can used for particularly accurate and efficient functioning testing.

According to a second aspect of the invention, a measurement device for measuring one or more characteristics ("performance", typically the modification of electromagnetic parameters of an incoming RF signal) of a reconfigurable intelligent surface is provided, Said measurement device is configured to support and/or perform at least one of the steps of the method according to the first aspect of the invention or any of its preferred implementation forms, respectively. Advantageously, not only performance but also correct functioning of reconfigurable intelligent surfaces can be tested in a highly accurate and efficient manner.

According to a first preferred implementation form of the second aspect of the invention, the measurement device is a handheld measurement device. Advantageously, for instance, especially in the context of field testing and manually moving the measurement device, the measurement device can be combined with a motion tracker providing positioning information to the corresponding operator preferably via a display.

According to a third aspect of the invention, a measurement system for measuring one or more characteristics ("performance", typically the modification of electromagnetic parameters of an incoming RF signal) of a reconfigurable intelligent surface is provided. Said measurement system comprises the reconfigurable intelligent surface, and a measurement device being configured to transmit a transmit signal to the reconfigurable intelligent surface, receive the corresponding refection from the reconfigurable intelligent surface as a receive signal, and compare the transmit signal and the receive signal to determine or derive phase and/or amplitude changes imposed by the reconfigurable intelligent surface. It is noted that said measurement device may especially be the measurement device according to the second aspect of the invention or preferred implementation forms thereof, respectively. Advantageously, not only performance but also correct functioning of reconfigurable intelligent surfaces can be tested in a highly accurate and efficient manner.

According to a first preferred implementation form of the third aspect of the invention, the measurement device is arranged in close proximity to the reconfigurable intelligent surface but especially outside of the corresponding reactive near field preferably to avoid respective direct coupling. Advantageously, for instance, inaccuracies can further be reduced.

According to a second preferred implementation form of the third aspect of the invention, the measurement system further comprises positioning means for varying the corresponding position of the measurement device. Additionally or alternatively, the measurement system and/or the measurement device comprises communication means for communicating with at least one control unit and/or at least one processing unit of the reconfigurable intelligent surface especially to read and/or set at least one corresponding signal and/or command preferably with respect to respective controlling and/or processing. Advantageously, for example, said at least one corresponding signal and/or command preferably with respect to respective controlling and/or processing may be correlated with the transmit signal and/or the receive signal, thereby especially allowing for correct functioning testing in a particularly efficient manner.

BRIEF DESCRIPTION OF THE DRAWINGS

Exemplary embodiments of the invention are now further explained with respect to the drawings by way of example only, and not for limitation. In the drawings.

DESCRIPTION OF SOME EXAMPLE EMBODIMENTS

Figure 1:
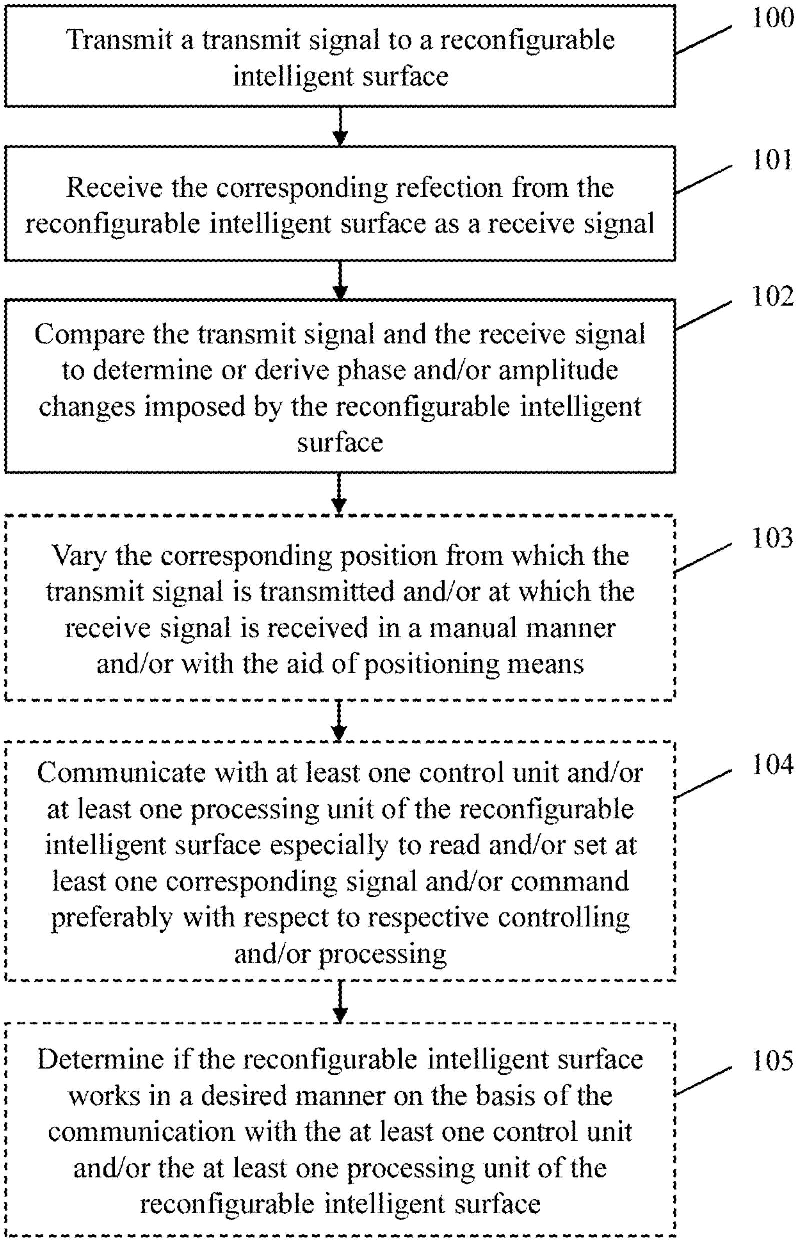
FIG. 1 shows a flow chart of an embodiment of the first aspect of the invention.

Firstly, FIG. 1 shows a flow chart of an embodiment of the inventive method for measuring one or more characteristics ("performance", typically the modification of electromagnetic parameters of an incoming RF signal) of a reconfigurable intelligent surface. In a first step 100, a transmit signal is transmitted to the reconfigurable intelligent surface. Then, in a second step 101, the corresponding refection is received from the reconfigurable intelligent surface as a receive signal. Furthermore, in a third step 102, the transmit signal and the receive signal are compared to determine or derive phase and/or amplitude changes imposed by the reconfigurable intelligent surface.

With respect to the reconfigurable intelligent surface, it is noted that the reconfigurable intelligent surface may especially comprise or be a passive reconfigurable intelligent surface. Alternatively, the reconfigurable intelligent surface can comprise or be an active reconfigurable intelligent surface.

In addition to this or as an alternative, the reconfigurable intelligent surface may especially comprise or have a planar or bent or spherical surface.

Moreover, it might be particularly advantageous if the comparison of the transmit signal and the receive signal is effected by radar and/or interference techniques. In this context, the method may especially comprise the step of effecting the comparison of the transmit signal and the receive signal by radar and/or interference techniques.

Additionally or alternatively, the transmit signal may be generated with the aid of at least one phase locked signal source. In this context, the method may especially comprise the step of generating the transmit signal with the aid of at least one phase locked signal source. Said step would especially be performed before the above-mentioned step 100.

It is further noted that it might be particularly advantageous if the receive signal is received with the aid of at least one receiver working in close proximity to the reconfigurable intelligent surface. In this context, the method may especially comprise the step of receiving the receive signal with the aid of at least one receiver working in close proximity to the reconfigurable intelligent surface. Said step would especially be combined with the above-mentioned step 101.

Moreover, it might be particularly advantageous if the transmit signal is transmitted from close proximity to the reconfigurable intelligent surface and/or the receive signal is received in close proximity to the reconfigurable intelligent surface but especially outside of the corresponding reactive near field preferably to avoid respective direct coupling. In this context, the method may especially comprise the step of transmitting the transmit signal from close proximity to the reconfigurable intelligent surface and/or receiving the receive signal in close proximity to the reconfigurable intelligent surface but especially outside of the corresponding reactive near field preferably to avoid respective direct coupling. Said step would especially be combined with step 100 or step 101, respectively.

As it can be seen from FIG. 1, in accordance with optional step 103, it is noted that it might be particularly advantageous if the method further comprises the step of varying the corresponding position from which the transmit signal is transmitted and/or at which the receive signal is received in a manual manner and/or with the aid of positioning means.

In accordance with a further optional step 104, the method further comprises the step of communicating with at least one control unit and/or at least one processing unit of the reconfigurable intelligent surface especially to read and/or set at least one corresponding signal and/or command preferably with respect to respective controlling and/or processing.

Moreover, according to a further optional step 105, the method further comprises the step of determining if the reconfigurable intelligent surface works in a desired manner on the basis of the communication with the at least one control unit and/or the at least one processing unit of the reconfigurable intelligent surface.

Figure 2:
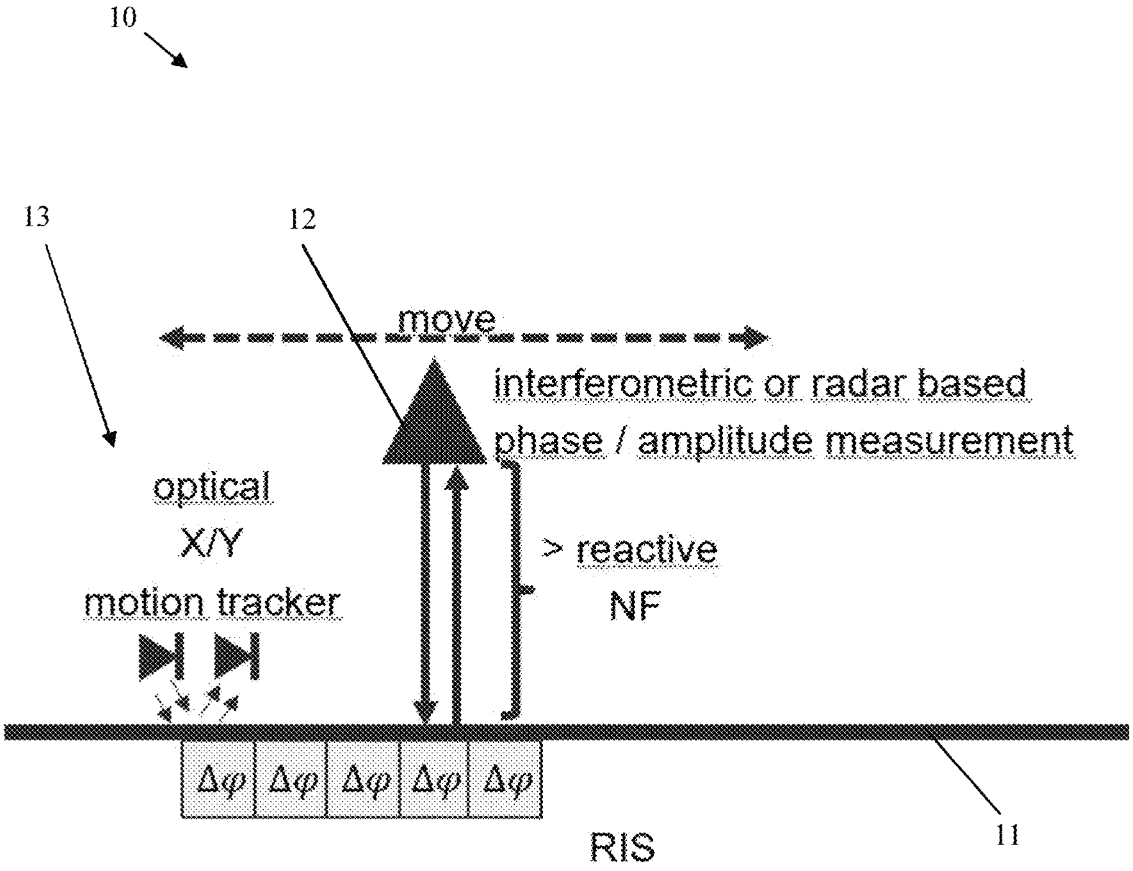
FIG. 2 shows an exemplary embodiment of the inventive system.

Now, with respect to FIG. 2, an exemplary embodiment of the inventive system 10 for measuring the performance of a reconfigurable intelligent surface 11 is illustrated.

According to FIG. 2, the system 10 comprises said reconfigurable intelligent surface 11 and a measurement device 12.

Said measurement device 12 may especially be a measurement device according to the second aspect of the invention and is configured to transmit a transmit signal to the reconfigurable intelligent surface 11, receive the corresponding refection from the reconfigurable intelligent surface 11 as a receive signal, and compare the transmit signal and the receive signal to determine or derive phase and/or amplitude changes imposed by the reconfigurable intelligent surface. Exemplarily, as it can be seen from FIG. 2, phase changes (illustrated by "$\Delta\phi$") are of particular interest.

In accordance with FIG. 2, the measurement device 12 is arranged in close proximity to the reconfigurable intelligent surface but especially outside of the corresponding reactive near field (illustrated by ">reactive NF") preferably to avoid respective direct coupling.

With respect to the measurement device 12, it is noted that said measurement device 12 is exemplarily configured to perform an interferometric and/or radar based phase and/or amplitude measurement.

Furthermore, in this exemplary case, the corresponding position of the measurement device 12 may be varied (illustrated by the double arrow with caption "move"). For instance, in the context of lab testing, a positioner, especially a x/y-positioner, may be used for moving the measurement device 12. Further exemplarily, in the context of field testing, the measurement device 12 may manually be moved especially over the reconfigurable intelligent surface 11.

As exemplarily shown by FIG. 2, especially in the context of moving the measurement device 12 in a manual manner, a tracker, preferably a motion tracker, more preferably a x/y-motion tracker, most preferably an optical x/y-motion tracker 13, such as an optical motion tracker being based on laser mouse technology, may be employed for providing corresponding positioning information. In other words, manually moving the measurement device 12 is assisted by the tracker 13 that especially provides positioning information. Accordingly, the system 10 comprises said tracker 13.

In addition to this, especially in the context of the tracker 13, the system 10 may further comprise a display to provide feedback, preferably real-time feedback, to the corresponding operator.

With general respect to reconfigurable intelligent surfaces such as the reconfigurable intelligent surface 11, it is noted that especially like beamforming antennas, reconfigurable intelligent surfaces typically consist of a high number of elements. Reconfigurable intelligent surfaces can be reflective or transmissive. Typically, each element of a reconfigurable intelligent surface applies phase and/or amplitude changes to an incoming wave that is either reflected or transmitted. Multiple elements may form a phased array that is able to tilt or even split incoming waves. Reconfigurable intelligent surfaces can be quite large, for instance, the size of windows or a billboard.

Figure 3:
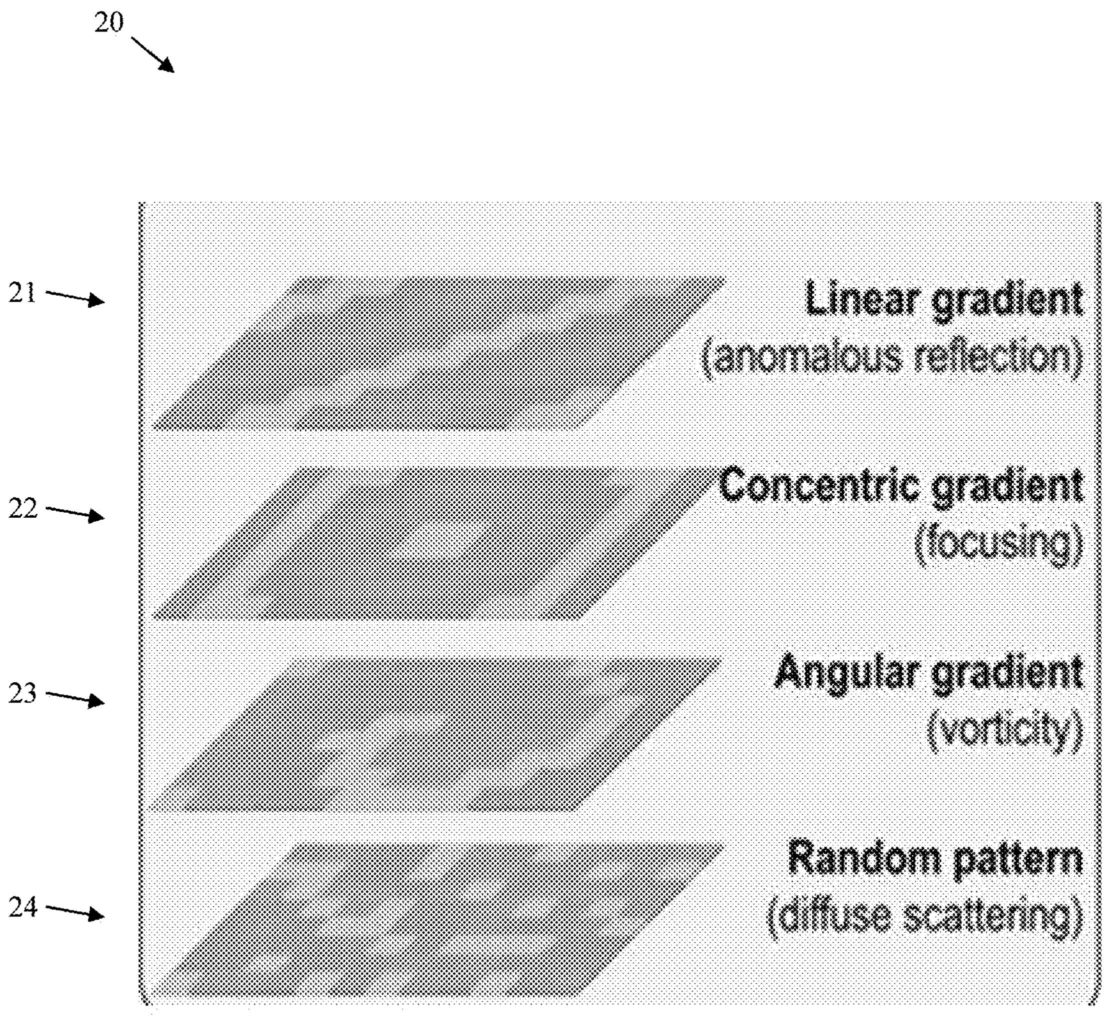
FIG. 3 shows exemplary reflection patterns with respect to a reconfigurable intelligent surface in the sense of the invention.

In this context, different reflection patterns 20 are exemplarily illustrated by FIG. 3. According to pattern 21, a linear gradient is shown, which leads to an anomalous reflection. Furthermore, a concentric gradient according to pattern 22 can be used for focusing such as beamforming. Moreover, an angular gradient leading to vorticity is shown by pattern 23. In addition to this, pattern 24 showing a random pattern leads to diffuse scattering.

Figure 4:
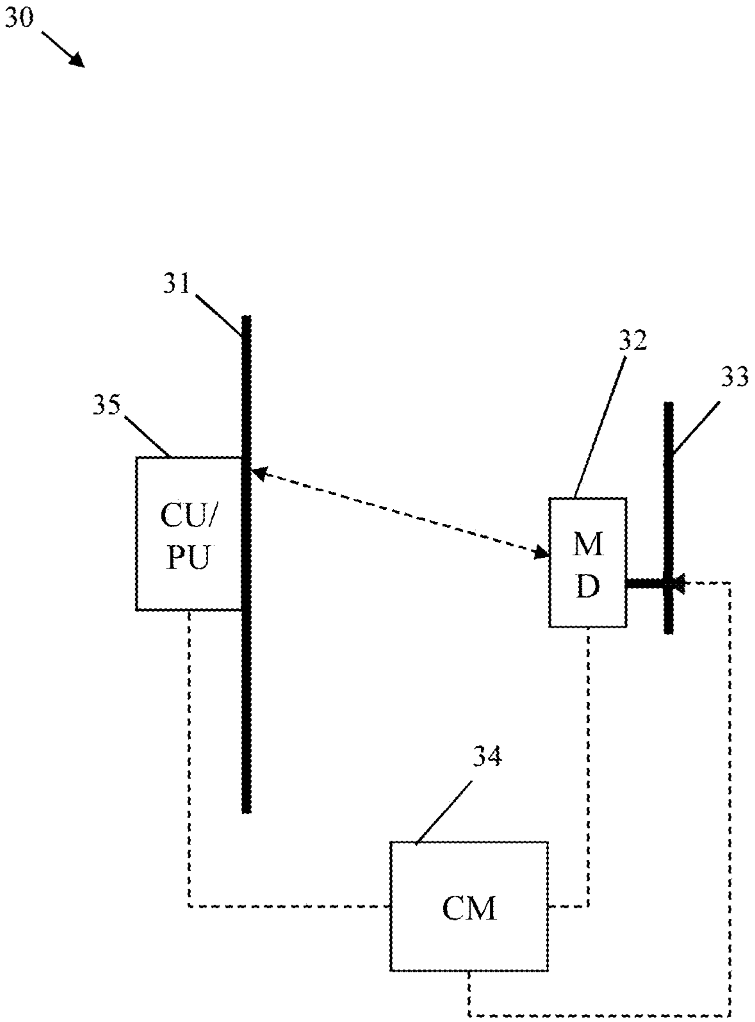
FIG. 4 shows a further exemplary embodiment of the inventive system especially in combination with an exemplary embodiment of the inventive device.

Finally, with respect to FIG. 4, a further exemplary embodiment 30 of the inventive system is depicted, which comprises a measurement device 32 especially according to the second aspect of the invention, and a reconfigurable intelligent surface 31.

In this context, the measurement device 32 may especially be configured to support and/or perform at least one of the steps of the method as described above. Furthermore, it might be particularly advantageous if the measurement device 32 is a handheld measurement device.

For the sake of completeness, it is noted that the features regarding the measurement system 10 and the measurement device 12 as described above may analogously apply for the measurement system 30 and the measurement device 32, and vice versa.

As it can further be seen from FIG. 4, the system 30 further comprises positioning means 33 for varying the corresponding position of the measurement device 32.

In addition to this, the system 30 comprises communication means 34 for communicating with a control unit and/or a processing unit 35 of the reconfigurable intelligent surface 31 especially to read and/or set at least one corresponding signal and/or command preferably with respect to respective controlling and/or processing especially on the basis of the transmit signal and/or the receive signal. In this context, the communication means 34 may be connected to the control and/or processing unit 35 of the reconfigurable intelligent surface 31 and to the measurement device 32.

It is noted that said communication means 34 can also be comprised, especially in the form of a communication unit, by the measurement device 32.

Furthermore, the above-mentioned communication means 34 may be connected to the positioning means 33 especially to read and/or set positioning information. In addition to this or as an alternative, the positioning means 33 may be connected to processing means being configured to read and/or set positioning information especially on the basis of the transmit and/or receive signal.

It is noted that said processing means 34 can also be comprised, especially in the form of a processing unit, by the measurement device 32.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for measuring one or more characteristics of a reconfigurable intelligent surface with the aid of a measurement device, the method comprising the steps of:

transmitting a transmit signal to the reconfigurable intelligent surface, receiving the corresponding reflection from the reconfigurable intelligent surface as a receive signal, comparing the transmit signal and the receive signal to determine or derive a phase change, an amplitude change, or a combination thereof imposed by the reconfigurable intelligent surface, and assisting, when manually moving the measurement device, by an optical motion tracker that provides corresponding positioning information of the measurement device.

2. The method according to claim 1, wherein the reconfigurable intelligent surface comprises or is a passive reconfigurable intelligent surface.

3. The method according to claim 1, wherein the reconfigurable intelligent surface comprises or has a planar or bent or spherical surface.

4. The method according to claim 1, wherein the comparison of the transmit signal and the receive signal is effected by a radar technique, an interference technique, or a combination thereof.

5. The method according to claim 1, wherein the transmit signal is generated with the aid of at least one phase locked signal source.

6. The method according to claim 1, wherein the receive signal is received with the aid of at least one receiver working in proximity to the reconfigurable intelligent surface.

7. The method according to claim 1, wherein the transmit signal is transmitted from proximity to the reconfigurable intelligent surface and/or the receive signal is received in proximity to the reconfigurable intelligent surface but outside of the corresponding reactive near field to avoid respective direct coupling.

8. The method according to claim 1, wherein the method further comprises a step of varying the corresponding position from which the transmit signal is transmitted, at which the receive signal is received, or a combination thereof in a manual manner, with the aid of positioning means, or a combination thereof.

9. The method according to claim 1, wherein the method further comprises the step of communicating with at least one control unit, at least one processing unit, or a combination thereof of the reconfigurable intelligent surface to read, to set, or a combination thereof at least one corresponding signal, one corresponding command, or a combination thereof with respect to respective controlling, respective processing, or a combination thereof.

10. The method according to claim 9, wherein the method further comprises the step of determining whether the reconfigurable intelligent surface works in a desired manner on the basis of the communication with the at least one control unit, the at least one processing unit, or the combination thereof of the reconfigurable intelligent surface.

11. A measurement device for measuring one or more characteristics of a reconfigurable intelligent surface, the measurement device being configured to support, to perform, or a combination thereof:

transmitting a transmit signal to the reconfigurable intelligent surface, receiving the corresponding reflection from the reconfigurable intelligent surface as a receive signal, and comparing the transmit signal and the receive signal to determine or derive a phase change, an amplitude change, or a combination thereof imposed by the reconfigurable intelligent surface, wherein manually moving the measurement device is assisted by an optical motion tracker that provides corresponding positioning information of the measurement device.

12. The measurement device according to claim 11, wherein the reconfigurable intelligent surface comprises or is a passive reconfigurable intelligent surface.

13. The measurement device according to claim 11, wherein the reconfigurable intelligent surface comprises or has a planar or bent or spherical surface.

14. The measurement device according to claim 11, wherein the comparison of the transmit signal and the receive signal is effected by a radar technique, an interference technique, or a combination thereof.

15. The measurement device according to claim 11, wherein the transmit signal is generated with the aid of at least one phase locked signal source.

16. The measurement device according to claim 11, wherein the measurement device is a handheld measurement device.

17. A measurement system for measuring one or more characteristics of a reconfigurable intelligent surface, the measurement system comprising:

the reconfigurable intelligent surface, an optical motion tracker, and a measurement device being configured to:

transmit a transmit signal to the reconfigurable intelligent surface, receive the corresponding reflection from the reconfigurable intelligent surface as a receive signal, and compare the transmit signal and the receive signal to determine or derive a phase change, an amplitude change, or a combination thereof imposed by the reconfigurable intelligent surface, wherein manually moving the measurement device is assisted by the optical motion tracker that provides corresponding positioning information of the measurement device.

18. The measurement system according to claim 17, wherein the measurement device is arranged in proximity to the reconfigurable intelligent surface but outside of the corresponding reactive near field to avoid respective direct coupling.

19. The measurement system according to claim 17, wherein the system further comprises positioning means for varying the corresponding position of the measurement device.

20. The measurement system according to claim 17, wherein the system, the measurement device, or a combination thereof comprises communication means for communicating with at least one control unit, at least one processing unit, or a combination thereof of the reconfigurable intelligent surface especially to read, to set, or a combination thereof at least one corresponding signal, at least one corresponding command, or a combination thereof with respect to respective controlling, respective processing, or a combination thereof.

* * * * *